(12) United States Patent
Mori et al.

(10) Patent No.: US 6,291,910 B1
(45) Date of Patent: Sep. 18, 2001

(54) ELECTRIC APPARATUS CAPABLE OF TURNING OFF A POWER SUPPLY CIRCUIT AUTOMATICALLY TO INHIBIT RESUMING OF OPERATION UNTIL SAFETY IS ENSURED AT THE TIME OF RESTORATION FROM ABNORMAL STOP

(75) Inventors: Toshiharu Mori; Katsuhiko Tochihara, both of Miyagi-ken; Kaoru Soeta, Kanagawa-ken, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/453,264

(22) Filed: Dec. 2, 1999

(30) Foreign Application Priority Data

Dec. 18, 1998 (JP) .................................................. 10-360944

(51) Int. Cl.[7] .................................................... H02H 3/211
(52) U.S. Cl. ............................................................ 307/125
(58) Field of Search ..................... 307/118, 125, 307/126, 66

(56) References Cited

U.S. PATENT DOCUMENTS

| 5,694,962 | 12/1997 | Kim . | |
| 6,081,047 | * 6/2000 | Tuttle et al. | 307/125 X |
| 6,208,042 | * 3/2001 | Solis | 307/125 |

* cited by examiner

*Primary Examiner*—Edward H. Tso
(74) *Attorney, Agent, or Firm*—Brinks Hofer Gilson & Lione

(57) ABSTRACT

In the electric apparatus of the present invention, when the supply of electric power to a primary power supply circuit is started, a check is made to see if the apparatus has been turned ON by operation of a switch device S, by collation with the contents stored in a memory (not shown), and in accordance with the result of the collation a control system circuit makes control to continue or interrupt the supply of electric power to the primary power supply circuit. Therefore, in the case of a rise from an abnormal condition such as power failure, the supply of electric power to the primary power supply circuit can be interrupted rapidly. Thus, whether a trouble has occurred or not during power failure can be checked before resuming the operation and the occurrence of a danger can be prevented thereby.

3 Claims, 6 Drawing Sheets

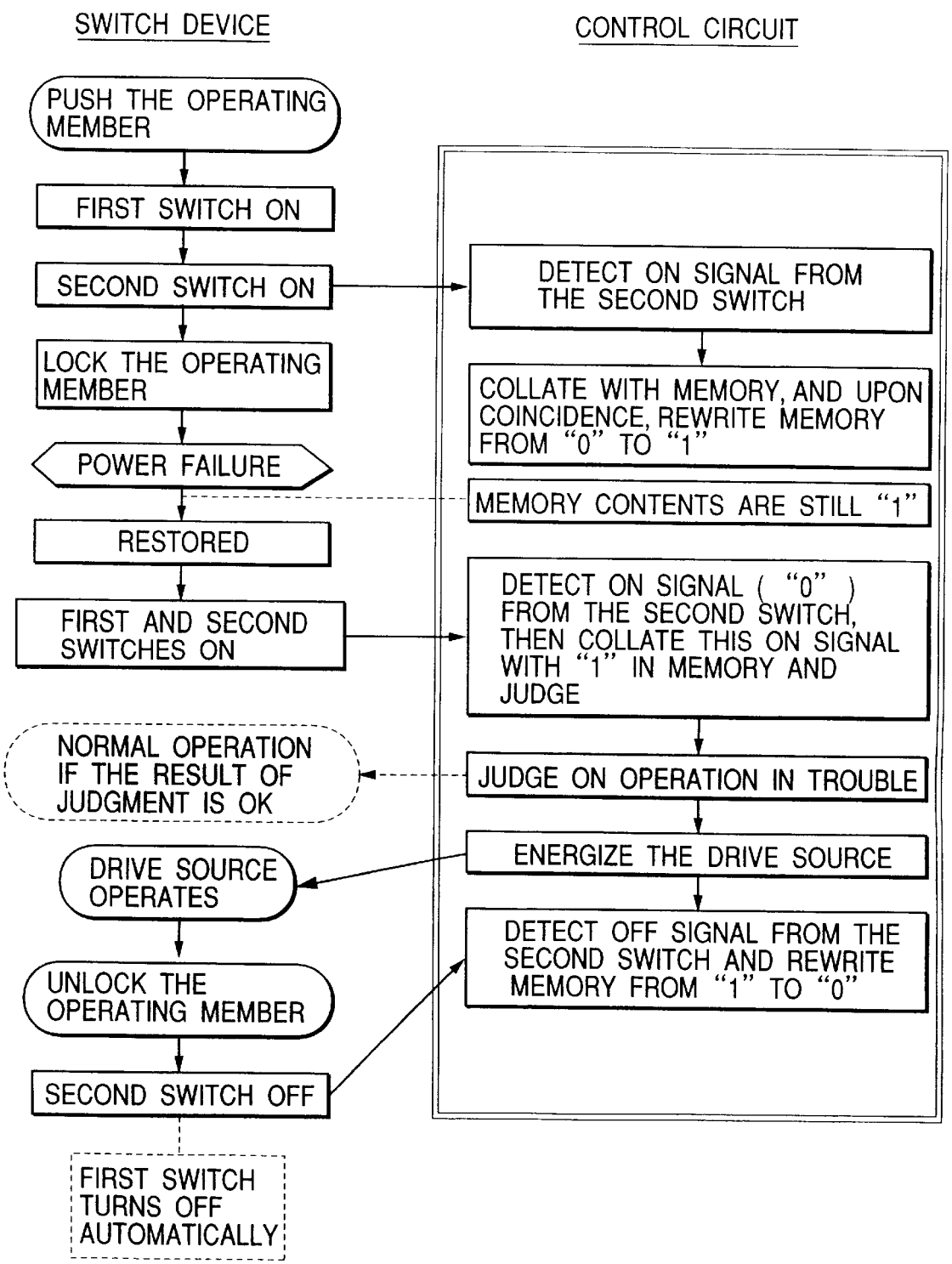

ELECTRIC APPARATUS CAPABLE OF TURNING OFF A POWER SUPPLY CIRCUIT AUTOMATICALLY TO INHIBIT RESUMING OF OPERATION UNTIL SAFETY IS ENSURED AT THE TIME OF RESTORATION FROM ABNORMAL STOP

BACKGROUND OF THE INVENTION

1. Field of the Invention

The present invention relates to an electric apparatus and more particularly to an electric apparatus capable of stopping operation automatically at the time of restoration from an electric failure and consequent stop of operation which occur during the supply of electric power to a power supply circuit.

2. Description of the Related Art

For example, such a conventional electric apparatus as a drying machine (not shown) is large-sized so as to permit drying of a lot of washing at a time. The interior size of the drying machine is suitable for entry of a child therein.

While such an electric apparatus is in operation, the interior thereof is closed with a lid which is locked.

However, when the drying machine is not in use, with a power supply circuit thereof turned OFF, the lid can be opened and closed, so that a child can open the lid and get in the interior of the drying machine to play hide-and-seek.

When the power supply circuit of such an electric apparatus is OFF, even if a child gets in the interior thereof, it is possible for the child to open and close the lid from the inside, with no likelihood of the child being confined.

However, upon occurrence of a trouble such as electric failure during operation of a conventional electric apparatus such as a drying machine for example, the operation is stopped with the power supply circuit thereof kept ON and the lid is unlocked and can be opened and closed. Thus, a child can open the lid of the drying machine and get in the interior of the machine to play.

When a child is playing inside the drying machine which is OFF due to power failure for example, if the supply of electric power is restored, the lid will be closed and locked and the operation of the drying machine will be resumed because the power supply circuit of the machine remains ON, with the result that the child playing inside is confined. This is very dangerous.

SUMMARY OF THE INVENTION

It is an object of the present invention to provide a highly safe electric apparatus capable of turning OFF a power supply circuit automatically to stop resuming of operation automatically even when the power supply circuit turns OFF upon occurrence of a trouble such as power failure during operation and then turns ON upon subsequent restoration of the supply of electric power.

According to the first means adopted by the present invention for achieving the above-mentioned object there is provided an electric apparatus comprising a primary power supply circuit, a secondary power supply circuit to which electric power is fed from the primary power supply circuit, a control system circuit connected to the secondary power supply circuit, a switch device having an operating member capable of being operated ON manually and being operated OFF manually or automatically, and a memory in which a signal outputted upon ON or OFF operation of the switch device is stored after detection thereof by the control system circuit, the switch device being connected to the primary power supply circuit, and the control system circuit being configured so that, when the supply of electric power to the primary power supply circuit has been started, the control system circuit determines whether the switch device has been operated ON or not, by collation with the contents stored in the memory and makes control to continue or cut off the supply of electric power to the primary power supply circuit in accordance with the result of the collation.

According to the second means adopted by the present invention for achieving the foregoing object there is provided, in combination with the first means, an electric apparatus wherein the switch device has a first switch and a second switch, the operating member can be held in a locked state manually or in an unlocked state manually or automatically, the first and second switches are turned ON when the operating member is in a locked state, while when the operating member is in an unlocked state, the first and second switches are turned OFF, the supply of electric power to the primary power supply circuit is controlled by ON/OFF operation of the first switch, and the second switch outputs an ON or OFF signal, which is detected by the control system circuit.

According to the third means adopted by the present invention for achieving the foregoing object there is provided, in combination with the second means, an electric apparatus wherein the switch device has a drive source capable of actuating the operating member automatically to turn OFF the first and second switches automatically, the ON or OFF signal outputted from the second switch is detected by the control system circuit and the contents stored in the memory are rewritten at every switching of the ON and OFF signals from one to the other, the control system circuit, upon turning ON of the first switch and start of the supply of electric power to the primary power supply circuit, collates the ON signal outputted from the second switch with the contents stored in the memory, and in accordance with the result of the collation the control system circuit makes control to continue the supply of electric power to the primary power supply circuit or causes the drive source to turn OFF the switch device automatically, thereby cutting off the supply of electric power to the primary power supply circuit.

BRIEF DESCRIPTION OF THE DRAWINGS

FIG. 8 is a diagram explaining the operation of the switch device and that of the control circuit both in an abnormal condition.

DETAILED DESCRIPTION OF A PREFERRED EMBODIMENT

Figure 1:
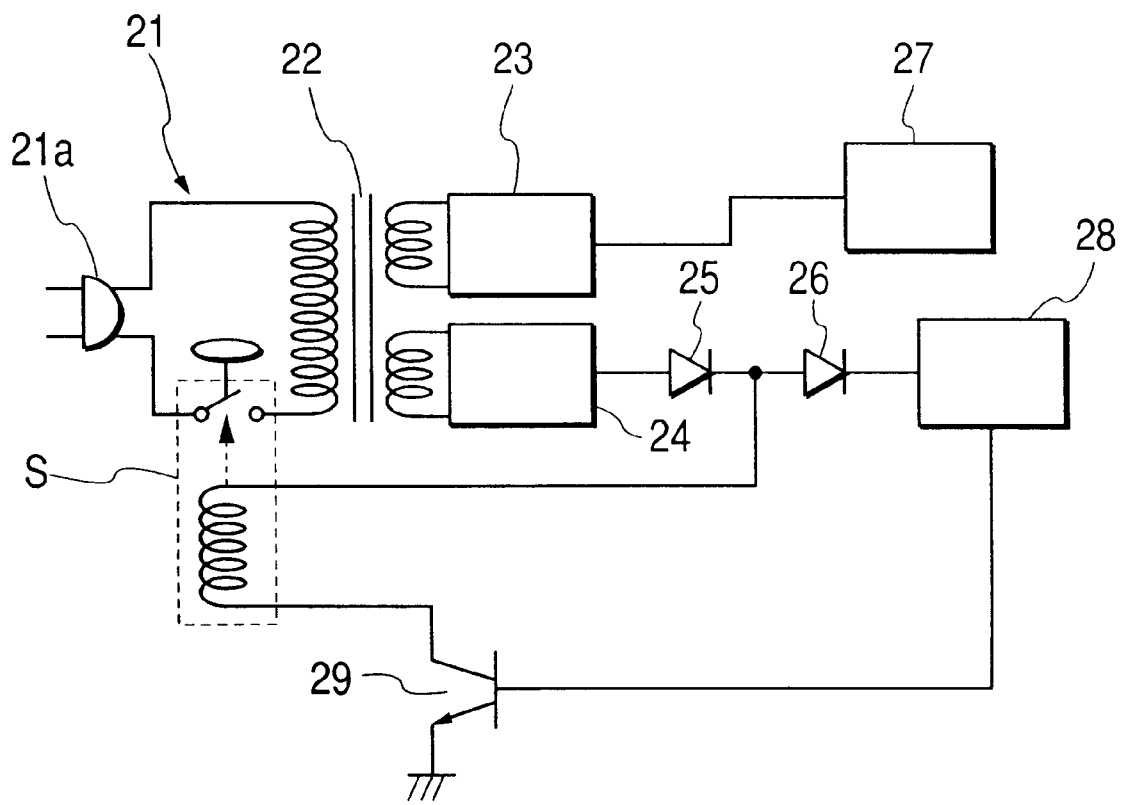
FIG. 1 is a circuit diagram of a principal portion of a power supply circuit used in an electric apparatus according to the present invention.
Figure 2:
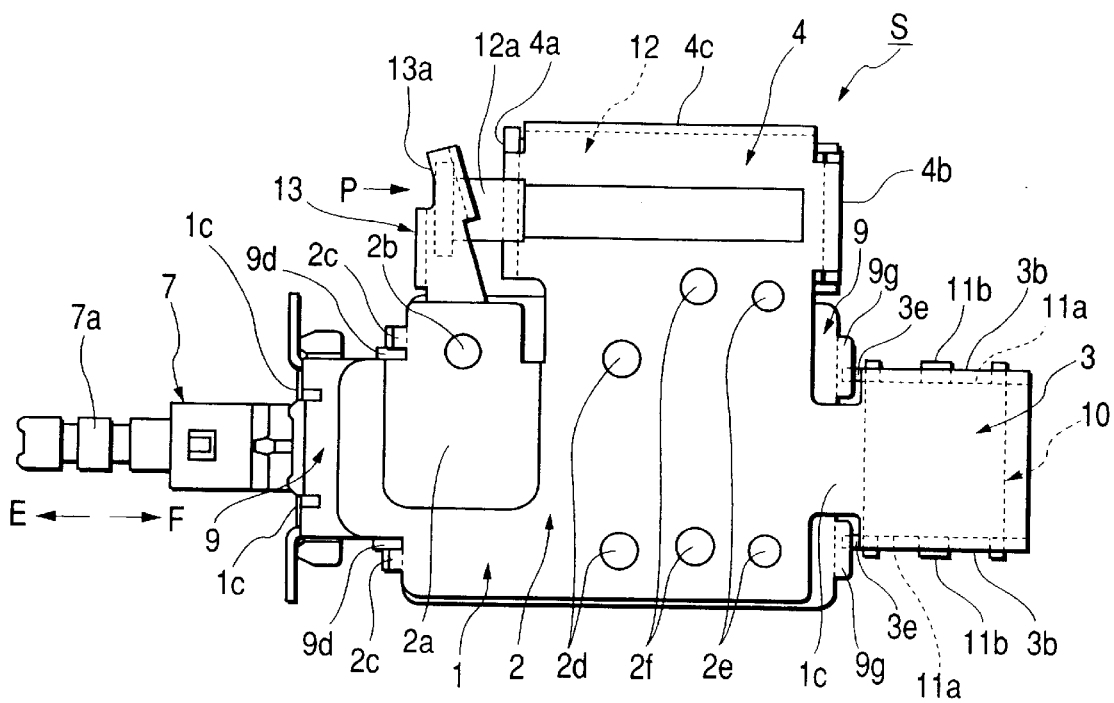
FIG. 2 is a top view of a switch device used in the power supply circuit.
Figure 3:
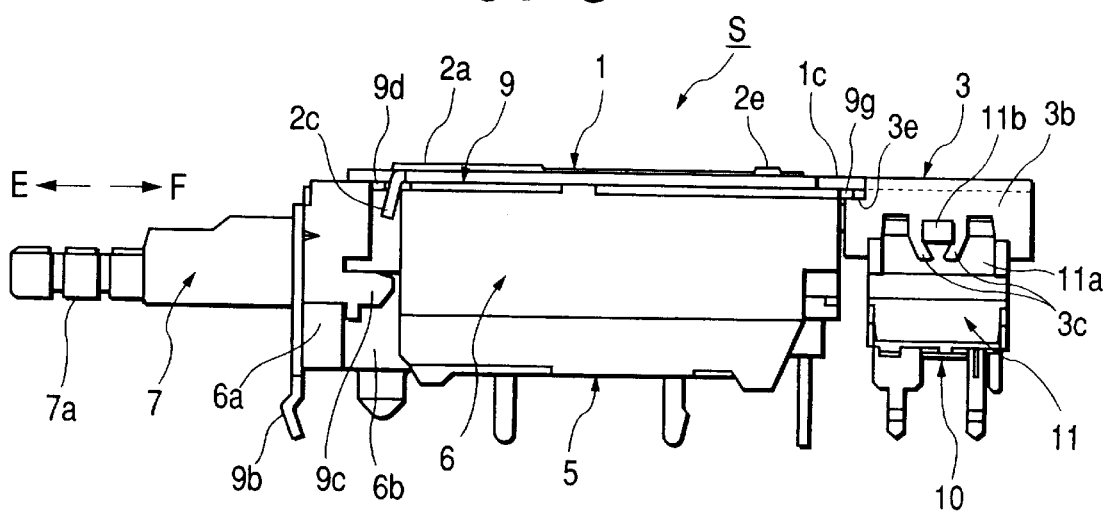
FIG. 3 is a front view of the switch device.
Figure 4:
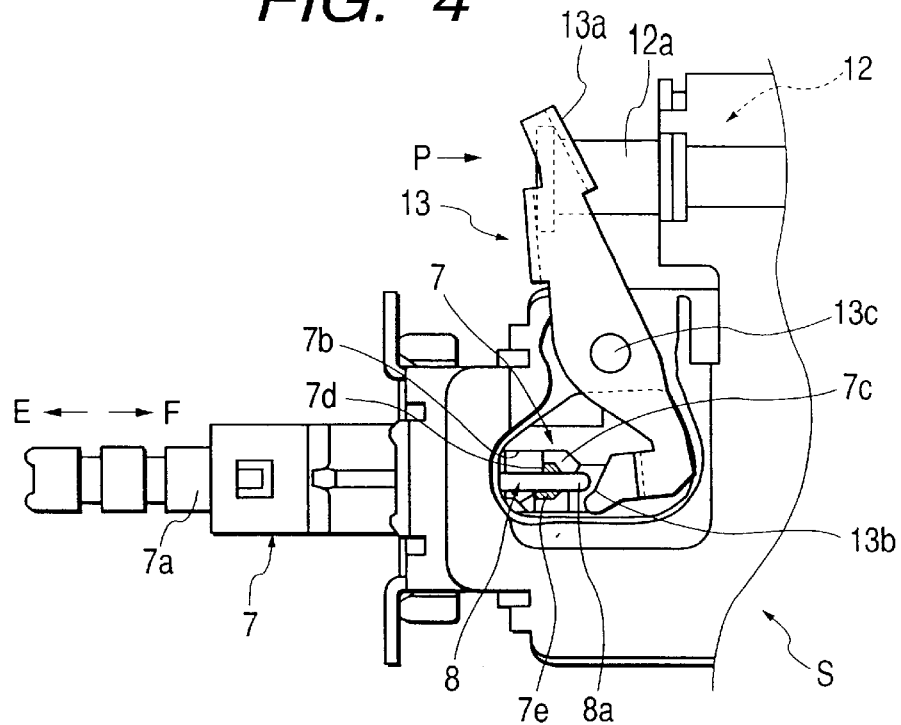
FIG. 4 is an enlarged diagram of a principal portion of the switch device for explaining the operation of the switch device.
Figure 5:
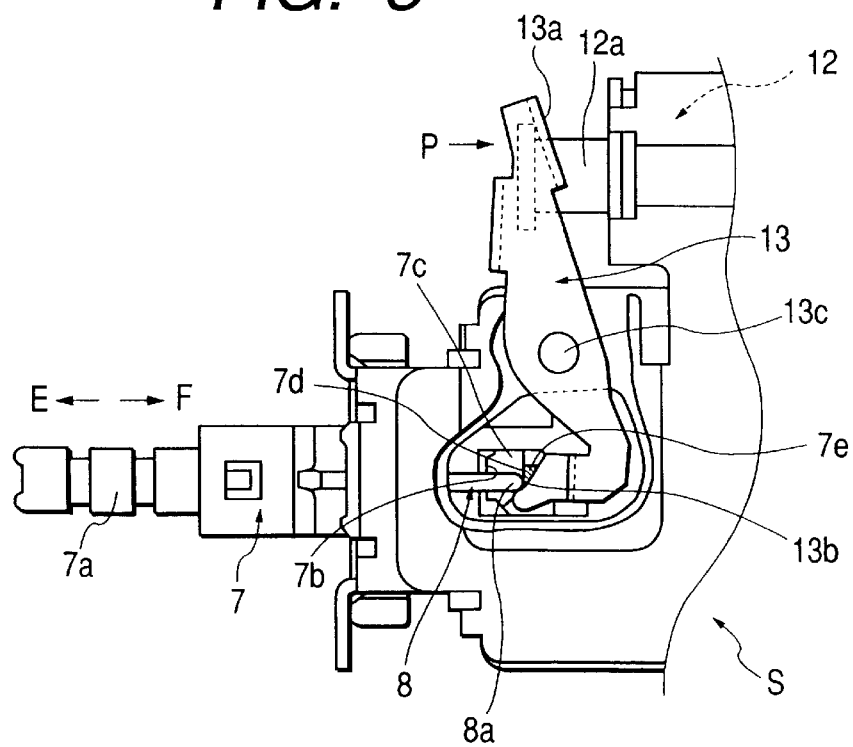
FIG. 5 is an enlarged diagram of the principal portion of the switch device for explaining the operation of the switch device.
Figure 6:
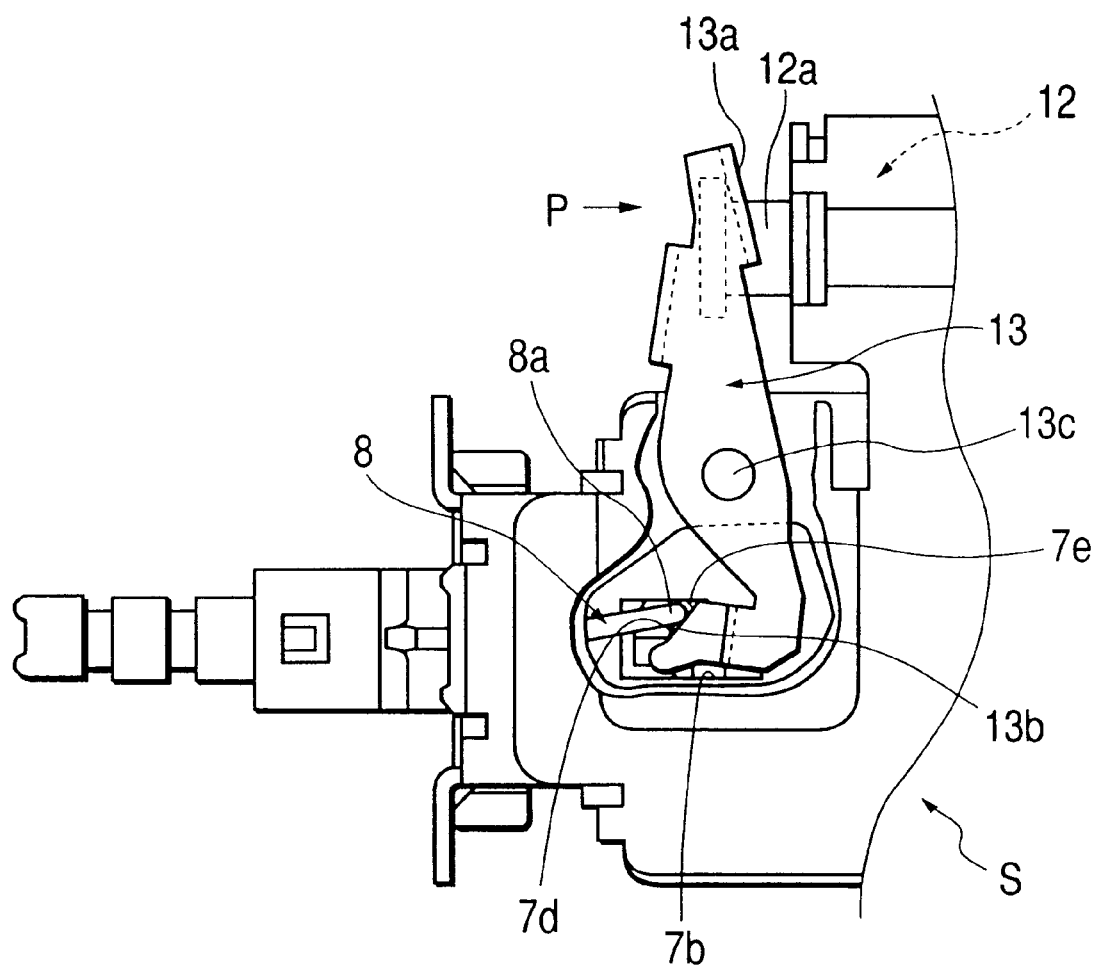
FIG. 6 is an enlarged diagram of the principal portion of the switch device for explaining the operation of the switch device.
Figure 7:
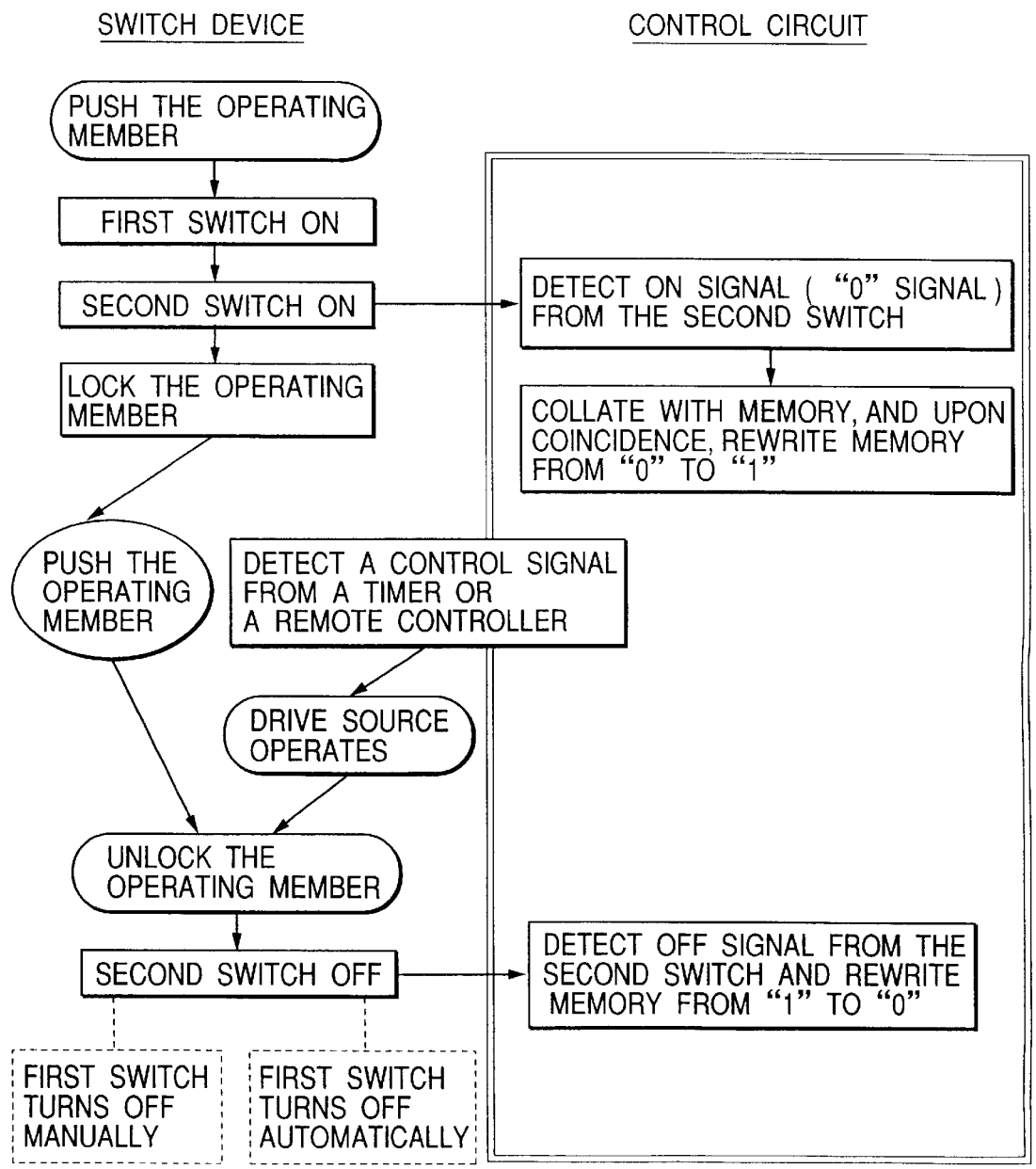
FIG. 7 is a diagram explaining the operation of the switch device and that of a control circuit used in the electric apparatus both in a normal condition.

An electric apparatus embodying the present invention will be described hereinunder with reference to the accompanying drawings, in which FIG. 1 is a circuit diagram of a principal portion of a power supply circuit used in the electric apparatus, FIGS. 2 and 3 are a top view and a front view of a switch device used in the power supply circuit, FIGS. 4 to 6 are enlarged diagrams of a principal portion of the switch device, and FIGS. 7 and 8 are diagrams each explaining a relation between the operation of the switch device and that of a control circuit.

The power supply circuit used in the electric apparatus (not shown) embodying the present invention, as shown in the circuit diagram of FIG. 1 which illustrates a principal portion of the same circuit, comprises a primary power supply circuit 21 (hereinafter referred to simply as the "primary circuit 21") to which AC 100V is fed from a terminal 21a, a switch device S connected to the primary circuit 21 and having an auto-OFF function, and a secondary power supply circuit to which electric power fed to the primary circuit 21 is fed through a power transformer 22, the secondary power supply circuit comprising a power supply circuit 23 for both signal system and motor system and a power supply circuit 24 for a control system.

The power supply circuit 23 for both signal system and motor system is connected to a signal system and motor system circuit 27. The power supply circuit 24 for a control system is connected via reverse current preventing diodes 25 and 26 to a control system circuit 28 constituted, for example, by a microcomputer having a reloadable memory (not shown) and also connected to the switch device S having two first and second switches 5 and 10 which will be described later. Electric power is fed to both control system circuit 28 and switch device S from the power supply circuit 24 for a control system.

The control system circuit 28 and the switch device S are connected together via a driving transistor 29. A power supply circuit in the electric apparatus embodying the present invention is thus configured schematically.

In the switch device S, which is connected to the primary circuit 21 used in the power supply circuit of the electric apparatus, a frame 1 constituted by a metallic plate obtained by punching with a press or the like is disposed at an upper position. The frame 1 is formed with an AC switch portion 2 for mounting a first switch 5 which is a switch for an AC circuit to be described later and a drive source mounting portion 4 for mounting a drive source 12 to be described later, the AC switch portion 2 and the drive source mounting portion 4 being formed adjacent each other On the right-hand side in the figure of the AC switch portion 2 is provided a DC switch portion 3 for mounting a second switch 10 which is a switch for a DC circuit to be described later, with a connecting portion 1c being formed between the AC switch portion 2 and the DC switch portion 3.

The AC switch portion 2 has a stepped portion 2a which is partially projected in a flat shape. The stepped portion 2a is formed with a downwardly projecting lug 2b.

On the front side of the AC switch portion 2 are formed two first tongue-like caulking portions 2c vertically, which are bent downward as shown in FIG. 3.

In the flat AC switch portion 2 positioned on the right-hand side of the stepped portion 2a there are formed a pair of downwardly projecting lugs 2d, a pair of upwardly projecting lugs 2e, and a pair of positioning through holes 2f located between the lugs 2d and 2e.

The DC switch portion 3 of the frame 1 is formed in a gate shape by vertically bending a pair of side plates 3b shown in FIG. 2.

The paired side plates 3b are each formed with such second tongue-like caulking portions 3c as shown in FIG. 3, and projections 11b of a second case 11 to be described later are each caulked between the second caulking portions 3c to retain the second switch 10 which will be described later.

In the DC switch portion 3, retaining portions 3e for retaining a rear portion of the first switch 5 to be described later are formed as cutout portions in the positions where the side plates 3b and the connecting portion 1c are contiguous to each other. The size of a gap formed between the retaining portion 3e and the underside of the connecting portion 1c is set a little larger than the thickness of a lid 9 which will be described later.

As shown in FIG. 2, the drive source mounting portion 4 comprises a front side plate 4a, a rear side plate 4b and an upper side plate 4c, which side plates are formed by bending.

The two first caulking portions 2c of the AC switch portion 2, the two side plates 3b of the DC switch portion 3, and the front side plate 4b, rear side plate 4c and side plate 4d of the drive source mounting portion 4 are bent downward in the same direction in FIG. 3.

The first switch 5, which is an AC switch mounted to the AC switch portion 2 of the frame 1, has a first case 6 The first case 6 is formed of a resin material and has an upper opening.

The first case 6 is formed with a forwardly projecting guide portion 6a, and a recess 6b is formed in a lower position of an outer surface of the guide portion 6a.

The first switch 5 has a fixed contact and a movable contact (neither shown) both disposed within the first case 6 and is further provided with an operating member 7 for operating the fixed contact and the movable contact ON and OFF. The operating member 7 is slidable in the directions of arrows E and F.

The operating member 7 is formed of a resin material and has an operating shaft 7a projecting outward from the front side of the first case 6. The operating shaft 7a is internally provided with a resilient member (not shown) for urging the operating member 7 in the arrow E direction at all times.

The operating member 7 is partially formed with such a cam recess 7b as shown in FIG. 4. In the cam recess 7b is formed a cam bottom 7c at a predetermined depth by cutting, the cam bottom 7c comprising a plurality of flat surfaces of different depths and a slant surface which connects the flat surfaces.

Nearly centrally of the cam bottom 7c there is projected a heart cam portion 7e having a locking wall 7d of a solid black.

A lock portion 8a of a lock member 8 which will be described later comes into abutment with the locking wall 7d, whereby the operating member 7 can be retained in a locked state.

The lock member 8, which is a metallic rod, is disposed in the cam recess 7b. Both end portions of the lock member 8 are bent approximately at right angles and with the lock portion 8a being formed at one end portion, the other end portion serving as a fulcrum (not shown) and being supported on the first case 6 side.

As the operating member 7 slides in the directions of arrows E and F, the lock portion 8a can move pivotally on the cam bottom 7c.

When the operating member 7 is pushed manually in the arrow F direction against the biasing force of the resilient member (not shown), the lock member 8 comes into abutment with the locking wall 7d while being guided by the cam bottom 7c, whereby the operating member 7 is locked and is inhibited its movement in the arrow E direction. When the operating member 7 is thus locked, the first switch 5 is turned ON and electric power is fed to the primary circuit 21 in the power circuit shown in FIG. 1.

On top of the first case 6 is disposed a lid 9 of a metallic plate which closes an opening (not shown) of the first case 6. As shown in FIG. 3, the lid 9 is formed with a pair of base mounting portions 9b and a front caulking portion 9c both on the front side, which are bent downward.

The lid 9 is formed with a pair of front retaining portions 9d projecting from the first case 6 at positions sandwiched between the frame 1 and the first caulking portions 2c shown in FIG. 2.

A pair of rear retaining portions 9g are formed projectingly on a rear side in FIG. 2 of the lid 9.

A rear caulking portion (not shown) is bent downward at a position between the rear retaining portions 9g and the lid 9 is rendered integral with the first case portion 6 by caulking both front caulking portion 9c and rear caulking portion to the first case 6.

The rear retaining portions 9g are engaged with the retaining portions 3e of the frame 1 and the front retaining portions 9d are caulked to the first caulking portions 2c of the frame 1, whereby the first switch 5 constituted by such an AC switch as described above is mounted to the AC switch portion 2 of the frame 1.

A second switch 10, which is a DC switch, is mounted to the DC switch portion 3 of the frame 1. The second switch 10 has a second case 11 formed of the same resin material as that of the first case 6, and as shown in FIG. 2, projections 11b are formed vertically from side walls 11a of the second case, The projections 11b are caulked by the caulking portions 3c, whereby the second switch 10 is mounted to the DC switch portion 3 of the frame 1.

In the second switch 10, an operating rod (not shown) projecting from the second case 11 toward the first switch 5 is formed on the lower surface side of the frame 1. Interlockedly with a sliding motion in the arrow E or F direction of the operating member 7 the operating rod slides and the second switch 10 turns ON and outputs an ON signal upon turning ON of the first switch 5, while upon turning OFF of the first switch 5 the second switch 10 also turns OFF and outputs an OFF signal.

Such ON and OFF signals from the second switch 10 are detected by a control system circuit 28 used in the power supply circuit shown in FIG. 1.

A drive source 12 of such as a solenoid, which is for turning OFF the first switch 5 automatically, is mounted to the drive source mounting portion 4 of the frame 1 shown in FIG. 2 The drive source 12 comprises a coil (not shown) and a moving core 12a. The coil is held grippingly between the front and rear side plates 4a, 4b of the frame 1 and is thereby prevented from dislodgment.

When the coil is energized from an initial deenergized state into an energized state, the moving core 12a is attracted in the direction of arrow P with a predetermined attractive force.

An engaging portion 13a of a drive member is engaged with a front end of the moving core 12a. As shown in FIG. 4, the drive member 13 is provided at one end with the engaging portion 13a and at the other end with a cam surface 13b, with a support hole 13c being formed in a position between the engaging portion 13a and the cam surface 13b.

The engaging portion 13a of the drive member 13 is engaged with a front end of the moving core 12b and the support hole 13c thereof is fitted on the lug 2b of the frame 1, whereby the drive member 13 is mounted to the frame 1 pivotably with the support hole 13c as a center.

Therefore, when the lock member 8 is positioned on the locking wall 7d and the operating member 7 is locked, if the drive source 12 is energized to attract the moving core 12a in the arrow P direction, the drive member 13 turns clockwise with the support hole 13c as a center and the cam surface 13b unlocks the lock portion 8a from the locking wall 7d, whereby the operating member 7 can be unlocked automatically.

Thus, the switch device S connected to the primary circuit 21 in the electric apparatus embodying the invention has the operating member 7 capable of being operated ON manually and OFF automatically and also has the drive source 12 capable of actuating the operating member 7 automatically to turn OFF the first and second switches 5, 10 automatically. The switch device S comprising these components is connected to the primary circuit 21.

In the electric apparatus being considered, when the control system circuit 28 detects an ON or OFF signal outputted from the second switch 10 during ON or OFF operation of the switch device S connected to the primary circuit 21, the control system circuit writes information such as "0" or "1" into a memory (not shown) formed in the same circuit.

With reference to the operation diagrams of FIGS. 4 to 6 and the block diagrams of FIGS. 7 and 8, the following description is now provided about the relation between the operation of the switch device S used in the electric apparatus and that of the control circuit 28 disposed in the power supply circuit shown in FIG. 1.

First, with the operating member 7 positioned on the leftmost side in FIG. 4 and the first and second switches 5, 10 turned OFF and assuming their initial state, the lock member 8 is positioned away from the locking wall 7d (a solid black portion).

In this state, when the operating member 7 is pushed in the direction of arrow F, as shown in FIG. 5, the lock member 8 is positioned on the locking wall 7d, the first switch 5 is turned ON, then the second switch 10 is turned ON, the operating member 7 is locked, and the operation of the electric apparatus is started.

Upon turning ON of the second switch 10, an ON signal (information of "0") is outputted. When the control system circuit 28 detects this ON signal, it collates information pre-stored in initialization in the memory of the control system circuit 28, for example, "0" information with the ON signal from the second switch 10, and if both are coincident with each other, the control system circuit rewrites information "0" to "1" in the memory.

In normal operation, the operation of the electric apparatus can be stopped by operating the switch device S manually or automatically to turn OFF the power supply circuit of the electric apparatus.

The electric apparatus which is in normal operation can be turned OFF manually in the following manner. When the operating member 7 of the switch device S is pushed in the arrow F direction, the lock member 8 positioned in the cam recess 7b is guided by the cam bottom 7c and is disengaged from the locking wall 7d, so that the operating member 7 is unlocked.

In this state, upon relief of the urging force applied in the arrow F direction to the operating member 7, the operating member 7 reverts to its initial state in the arrow E direction under the action of the resilient member (not shown), so that the second switch 10 is turned OFF and then the first switch 5 is turned OFF to turn OFF the power supply circuit, whereby the operation of the electric apparatus can be stopped.

The electric apparatus which is in normal operation can be turned OFF automatically in the following manner. When the control system circuit 28 detects a control signal issued from a timer installed in the electric apparatus or from a remote controller or the like, electric power is fed to the drive source 12 in accordance with a command issued from the circuit 28, so that the moving core 12*a* is attracted in the arrow P direction.

As a result, the drive member 13 turns clockwise with the support hole 13*c* as a center and, as shown in FIG. 6, the cam surface 13*b* of the drive member 13 is positioned on the locking wall 7*d* and pushes the lock member 8 upward, whereby the lock member 8 is disengaged from the locking wall 7*d* and the operating member 7 is unlocked from the locked state.

When the operating member 7 is unlocked, the operating member 7 is returned in the arrow E direction by virtue of the resilient member (not shown), the second switch 10 and the first switch 5 are turned OFF automatically in this order, the switch device S reverts to its initial state automatically. Then, the power supply circuit is turned OFF automatically and thus the operation of the electric apparatus can be stopped.

Upon turning OFF of the second switch 10, an OFF signal (information of "1") is outputted and the control system circuit 28 detects this OFF signal and rewrites information from "1" to "0."

As a result of the first switch 5 turning OFF, the supply of electric power to the primary circuit 21 is interrupted and the supply of electric power to the secondary circuit comprising the signal and motor system power supply circuit 23 and the signal system power supply circuit 24 is also interrupted, whereby the consumption of stand-by electric power (cold reserve) can be made zero.

The power supply of the electric apparatus can again be turned ON normally by operating the switch device S in accordance with the procedure described above to control the control system circuit 28.

When the operation of the electric apparatus stops upon occurrence of a trouble such as power failure during operation of the apparatus and when the supply of electric power is then restored and the operation resumed, the switch device S and the control system circuit 28 operate in the following manner. This will be described below with reference to FIG. 8.

The operations until the operating member 7 is locked after turning ON of the first and second switches 5, 10 are the same as the above operations in normal condition, so an explanation thereof will here be omitted.

Even if the power supply circuit of the electric apparatus is turned ON and the operation of the apparatus stops upon occurrence of a trouble such as power failure during operation of the apparatus, the information "1" remains stored in the memory of the control system circuit 28.

In this state, when the supply of electric power is restored, the first and second switches 5, 10 are turned ON because the operating member 7 remains locked. Upon turning ON of the second switch 10, an ON signal (information of "0") is outputted from the second switch 10. The control system circuit 28 detects this ON signal, then collates the ON signal with information "1" stored in the memory and makes determination.

Since the ON signal (information of "0") provided from the second switch 10 and the information of "1" stored in the memory are not coincident with each other, the control system circuit 28 determines that the result is NG and that the ON operation of the switch device S is not in normal condition but in abnormal condition.

When the control system circuit 28 determines that the ON operation is in abnormal condition, electric power is fed to the drive source 12 of the switch device S in accordance with a command issued from the control system circuit.

Consequently, the drive source 12 is operated, the operating member 7 is unlocked, the second switch 10 and the first switch are turned OFF automatically in this order to cut off the supply of electric power to the primary circuit 21, and the operation of the electric apparatus is stopped automatically. Thus, it is possible to make sure whether any trouble has occurred or not in the electric apparatus during power failure When the second switch 10 is turned OFF automatically, an OFF signal (information of "1") is outputted from the second switch 10 and the control system circuit 28 detects this OFF signal and rewrites the memory contents from information "1" to "0," thus indicating that the power supply circuit of the electric apparatus has been turned OFF in normal operation.

Thus, in the electric apparatus of the present invention, the memory contents are rewritten unconditionally when the second switch 10 is OFF, while when the second switch 10 is ON, the memory contents are rewritten on the basis of the result of comparison between the memory contents and the signal provided from the second switch 10.

If the electric apparatus constructed as above is a drying machine for example and upon occurrence of a dangerous act, for example, in the event a child opens the lid and enters the interior of the drying machine when the machine is OFF in an abnormal condition such as power failure, the control system circuit 28 detects a rise from the abnormal condition after restoration and before restart-up of operation of the drying machine and causes the switch device S to operate automatically, thereby making it possible to stop the restart-up of operation of the drying machine In this electric apparatus embodying the invention, even when the operation of the apparatus stops due to some trouble such as power failure and the power supply circuit is turned ON after restoration, the control system circuit 28 causes the power supply circuit to turn OFF in an instant and the operation of the electric apparatus can be resumed after making sure if any trouble has occurred or not in the electric apparatus during power failure.

In the electric apparatus according to the present invention, as set forth above, when the supply of electric power to the primary power supply circuit has been started, whether the apparatus has been turned ON by operation of the switch device or not is determined by collation with memory contents in the control system circuit and in accordance with the result of this collation there is made control as to whether the supply of electric power to the primary power supply circuit is to be continued or interrupted. Therefore, upon restoration from power failure or the like and turning ON of the switch device, it is possible to immediately cut off the supply of electric power to the primary power supply circuit and check before restart-up of operation whether any trouble has occurred or not during power failure, that is, the occurrence of a danger can be prevented. Thus, it is possible to provide a highly safe electric apparatus.

Besides, the switch device has first and second switches and the operating member can be held in a locked state manually and in an unlocked state manually or automatically. When the operating member is locked, the first and second switches are turned ON, while when the operating member is unlocked, both switches are turned OFF The supply of electric power to the primary power supply circuit is controlled in accordance with ON/OFF operation of the first switch, and the second switch outputs an ON or OFF signal, which is detected by the control system circuit. Thus, the first and second switches can be operated ON and OFF simultaneously by operation of the operating member and it is possible to provide an electric apparatus provided with a switch device superior in operability.

Moreover, since the primary circuit can be turned OFF by the first switch, it is possible to provide an electric apparatus with reduced consumption of stand-by electric power (cold reserve).

The switch device has a drive source capable of actuating the operating member automatically and thereby turning OFF the first and second switches automatically. The second switch can output ON and OFF signals in response to operation of the operating member and these signals are detected by the control system circuit, which in turn rewrites the memory contents at every switch-over between the ON and OFF signals. When the first switch is turned ON and the supply of electric power to the primary power supply circuit is started, the control system circuit collates the ON signal outputted from the second switch with the contents stored in the memory, and in accordance with the result of this collation the control system circuit makes control to continue the supply of electric power to the primary power supply circuit or causes the drive source to turn OFF the switch device automatically, thereby interrupting the supply of electric power to the primary power supply circuit. Thus, upon restoration from power failure for example, the control system circuit detects a rise from an abnormal condition and makes control to turn OFF the primary circuit automatically, thereby once stopping the operation. Thus, the operation can be resumed after checking whether any trouble has occurred or not during power failure, thereby permitting the provision of a highly safe electric apparatus.

What is claimed is:

1. An electric apparatus comprising:
   a primary power supply circuit;
   a secondary power supply circuit to which electric power is fed from said primary power supply circuit;
   a control system circuit connected to said secondary power supply circuit;
   a switch device having an operating member capable of being operated ON manually and being operated OFF manually or automatically; and
   a memory in which a signal outputted upon ON or OFF operation of said switch device is stored after detection thereof by said control system circuit,
   said switch device being connected to said primary power supply circuit, and
      said control system circuit being configured so that, when the supply of electric power to said primary power supply circuit has been started, said control system circuit determines whether said switch device has been operated ON or not, by collation with the contents stored in said memory and makes control to continue or cut off the supply of electric power to said primary power supply circuit in accordance with the result of the collation.

2. An electric apparatus according to claim 1, wherein said switch device has a first switch and a second switch, said operating member can be held in a locked state manually or in an unlocked state manually or automatically, said first and second switches are turned ON when said operating member is in a locked state, while when the operating member is in an unlocked state, said first and second switches are turned OFF, the supply of electric power to said primary power supply circuit is controlled by ON/OFF operation of said first switch, and said second switch outputs an ON or OFF signal, which is detected by said control system circuit.

3. An electric apparatus according to claim 2, wherein said switch device has a drive source capable of actuating said operating member automatically to turn OFF said first and second switches automatically, the ON or OFF signal outputted from said second switch is detected by said control system circuit and the contents stored in said memory are rewritten at every switching of the ON and OFF signals from one to the other, said control system circuit, upon turning ON of said first switch and start of the supply of electric power to said primary power supply circuit, collates the ON signal outputted from said second switch with the contents stored in the memory, and in accordance with the result of the collation the control system circuit makes control to continue the supply of electric power to the primary power supply circuit or causes said drive source to turn OFF the switch device automatically, thereby cutting off the supply of electric power to the primary power supply circuit.

* * * * *